United States Patent [19]

Metcalfe, deceased

[11] Patent Number: 4,977,750
[45] Date of Patent: Dec. 18, 1990

[54] MODULAR ROOM AIR CONDITIONER AND METHOD FOR MAKING SAME

[76] Inventor: Frederick S. Metcalfe, deceased, late of 23 Dorset Ct., Somerset, N.J. 08873

[21] Appl. No.: 234,542

[22] Filed: Aug. 22, 1988
(Under 37 CFR 1.47)

[51] Int. Cl.⁵ .............................................. F25D 19/00
[52] U.S. Cl. .......................................... 62/77; 52/584; 52/588; 62/298; 403/335
[58] Field of Search .......................... 62/77, 298, 429; 52/584, 588; 403/331, 335, 408.1

[56] References Cited

U.S. PATENT DOCUMENTS

| | | | |
|---|---|---|---|
| 2,891,389 | 6/1959 | Tull | 62/298 |
| 4,346,568 | 8/1982 | Perrone et al. | 62/298X |
| 4,100,764 | 7/1978 | Murano | 62/298X |
| 2,959,037 | 11/1960 | Mehaleck et al. | 62/298X |
| 2,939,297 | 6/1960 | Karzer et al. | 62/298 |
| 4,223,503 | 9/1980 | Hague | 52/588X |
| 3,898,783 | 8/1925 | Matlock et al. | 52/588X |
| 3,733,767 | 5/1973 | Craik | 52/588X |

Primary Examiner—William E. Tapolcai
Attorney, Agent, or Firm—Pearne, Gordon, McCoy & Granger

[57] ABSTRACT

A room air conditioner is assembled from prefabricated modular units. A refrigeration system module allows the compressor, condenser and evaporator to be per-assembled on a base. An air system allows the fan motor, fans, shrouds and other partitions to be pre-assembled as a unit and the electrical controls and mounting panel are pre-assembled as another unit. These units are then sequentially assembled on a main assembly line into the finished air conditioner unit.

7 Claims, 12 Drawing Sheets

MODULAR ROOM AIR CONDITIONER AND METHOD FOR MAKING SAME

This invention relates to air conditioners, and is more in particular directed to an air conditioner, and a method for making the same, wherein the air conditioner is formed of modular units.

In the past, in the production of room air conditioners and the like, it has been conventional to perform the assembly of a large number of components individually on a common air conditioner assembly. Such assembly increased the cost and time for the production of completed air conditioner units.

The present invention is therefore directed to a method simplifying and rendering more economical the production of room air conditioners, and to an air conditioner produced by this method.

Briefly stated, in accordance with the invention, an air conditioner unit is fabricated of three primary modules, i.e. a refrigeration system module, an air system module, and a control system module.

The refrigeration system module is comprised of a refrigeration system, with all of the refrigerant passing components of the air conditioner, including for example, the interconnected compressor, evaporator and condensor. These components are separately mounted on a base at the bottom of the module.

The air system module is designed to be mountable in a vertical direction onto the refrigeration system module as a unit. This air system module includes a first bulkhead adapted to be fit between the evaporator and condensor, a motor mounted to the first bulkhead, a fan driven by the motor on the side of the first bulkhead toward the condensor, and a blower driven by the motor and arranged on the other side of the first bulkhead.

The control system module is also mountable in a vertical direction onto the refrigeration system module as a unit. This air system module includes a second bulkhead adjoining the first bulkhead, a control panel, and a control arrangement for controlling the motor.

By forming an air conditioner of three such modules, the assembly of the modules may be effected on separate assembly lines, with the separate modules being assembled only in the final assembly stages.

The invention further is directed to the position of an improved motor mounting for the motor, to reduce noise thereof, as well as to an improved seal between the two bulkhead portions, rendering assembly thereof possible in a simple and economical manner.

In order that the invention may be more clearly understood, it will now be disclosed in greater detail with reference to the accompanying drawings, wherein.

Figure 1:
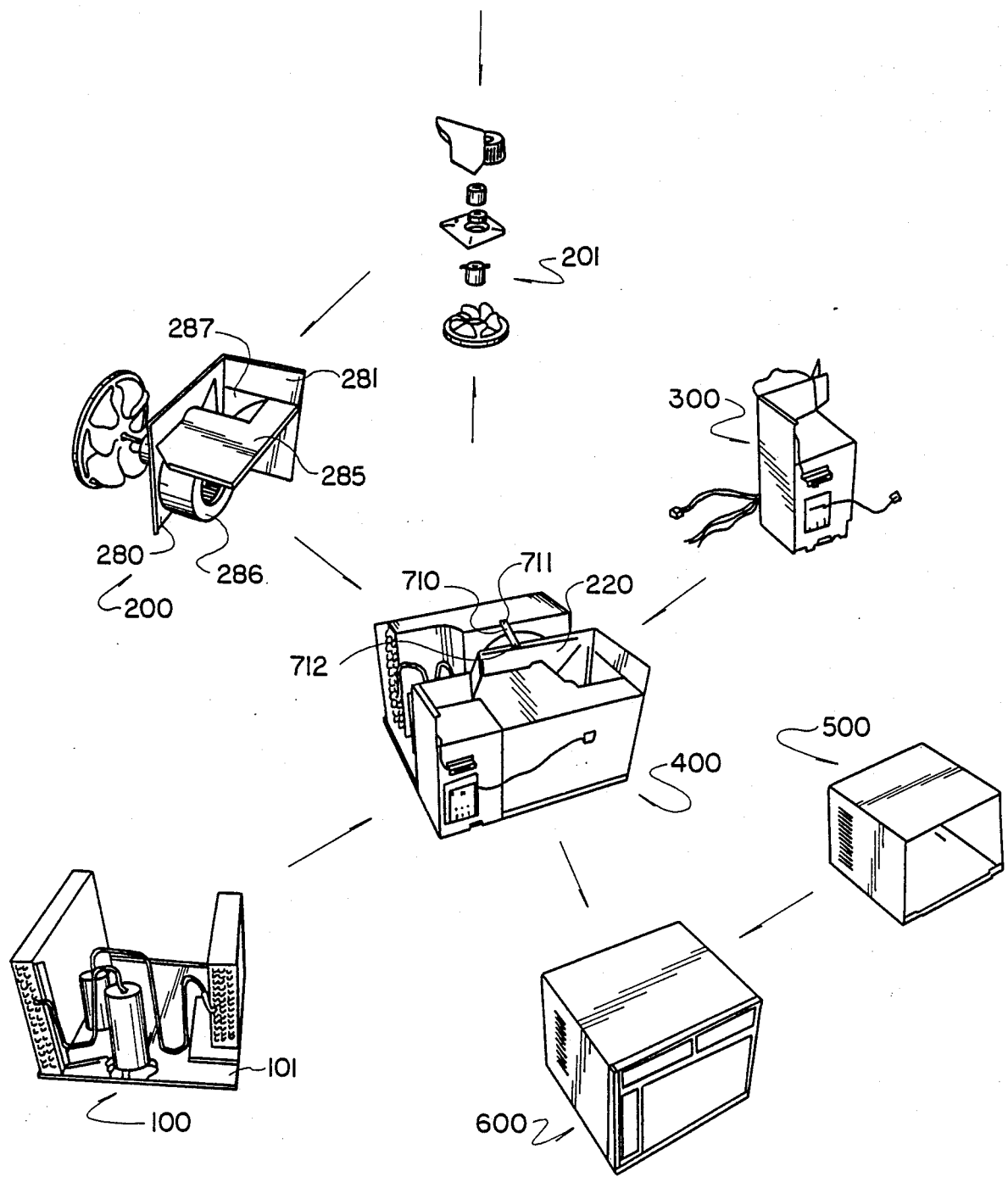
FIG. 1 is an exploded perspective view of an air conditioner in accordance with the invention.

FIG. 1 illustrates the assembly components and techniques for assembling the air conditioner of the invention. As illustrated, a refrigeration system module 100, an air system module 200, and an electrical control system module 300 are separately prefabricated to form the air conditioner chassis 400, following which the air conditioner chassis 400 is assembled in a cabinet 500 to produce the air conditioner 600. Each of the modules 100, 200, 300 is fabricated separately on a separate feeder line, as will be discussed, to minimize the manufacturing cost and time for the assembly of the air conditioner 600 on a main assembly line. Thus, the refrigeration system module 100 is comprised of a base 101 on which the other components thereof are assembled, the components being arranged so that the air system module 200 is readily assembled to the refrigeration system module from above the refrigeration system module, and the electrical control system module 300 may be then assembled downwardly into the refrigeration and air system modules. The assembly of the units downwardly as discussed simplifies the assembly procedure.

FIG. 1 further illustrates the assembly of a plurality of components 201 in a single direction, in so far as possible, to form the air system module. Thus, in accordance with the invention, in addition to the preparation of modules for assembly in the final air conditioner in the simplest manner, each of the modules is also fabricated of simply assembled components.

Figure 2:
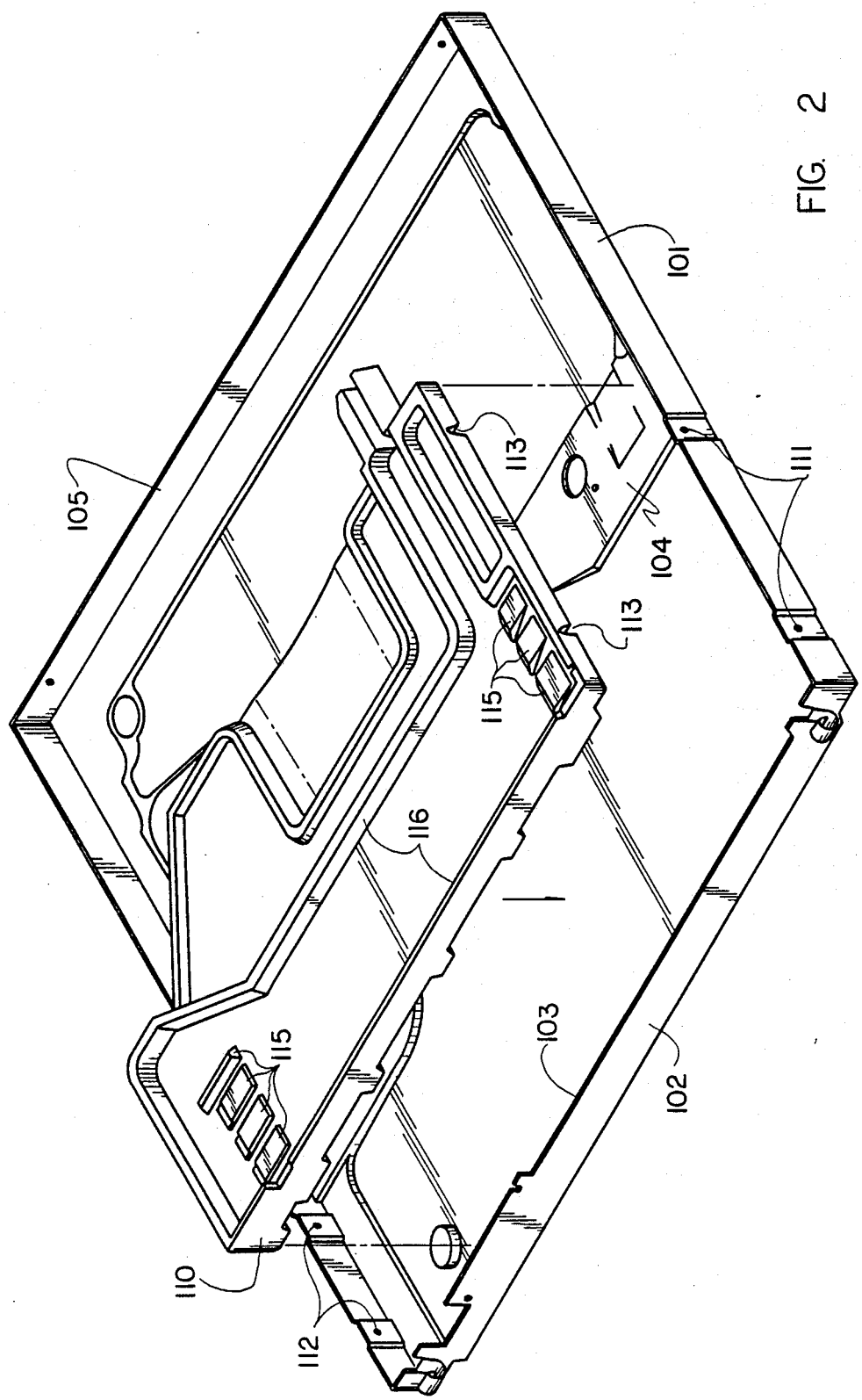
FIG. 2 is a perspective view of the base of the refrigeration system module.
Figure 3:
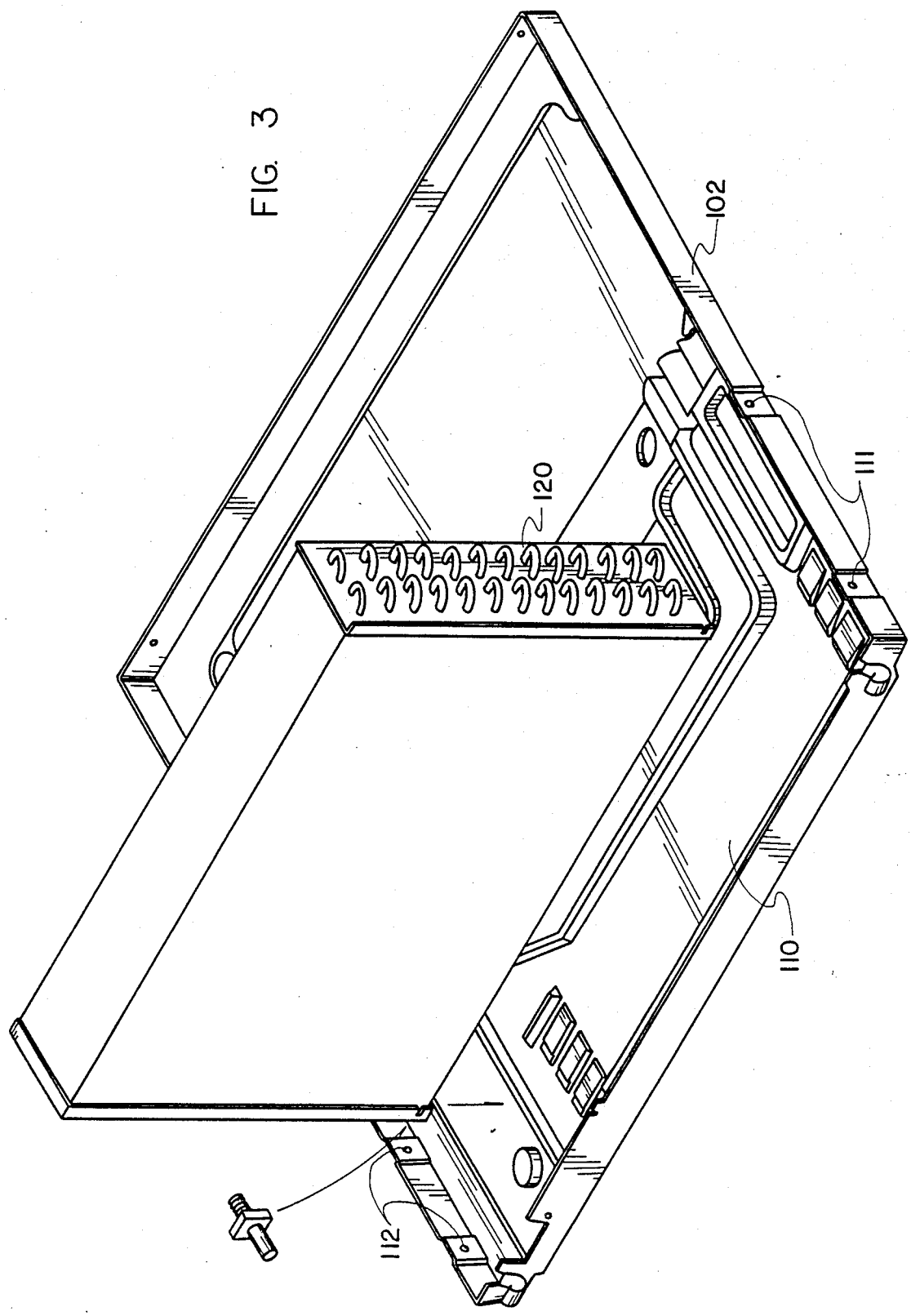
FIG. 3 is a perspective view of a partially assembled refrigeration system module.

As illustrated in FIG. 2, the base 101 may be comprised of a metal frame 102 having upwardly flanged edges 103 at its four sides, the central portion having a central web 104 extending thereacross. The periphery of the bottom has inwardly extending flanges 105. The frame 102 is configured to receive mounting plates or other elements for refrigerating system components, such as the mounting plate 110. The mounting plate 110 illustrated in FIG. 2 may be of a plastic material and is adapted for receiving and mounting the evaporator 120, as illustrated in FIG. 3. The mounting plate 110 is mounted vertically into the frame 102 and held therein by conventional snap connections (not illustrated), the central recess of the plate 110 having molded therein projections 115 and flanges 116 for aligning and snap fit holding of the evaporator 120.

The upwardly extending flange 103 may be provided with mounting holes 111, 112 therein for mounting of other modules to the base, although other mounting techniques may be employed for this purpose. Recesses 113 are provided on the perimeter of the plate 110 to provide clearance for screws (not shown) extending through the holes 111.

The mounting plate 110 may be configured at its periphery, i.e. the sides not adjacent upwardly extending flanges of the frame, to guide and mount the air system module and electrical control module.

Figure 4:
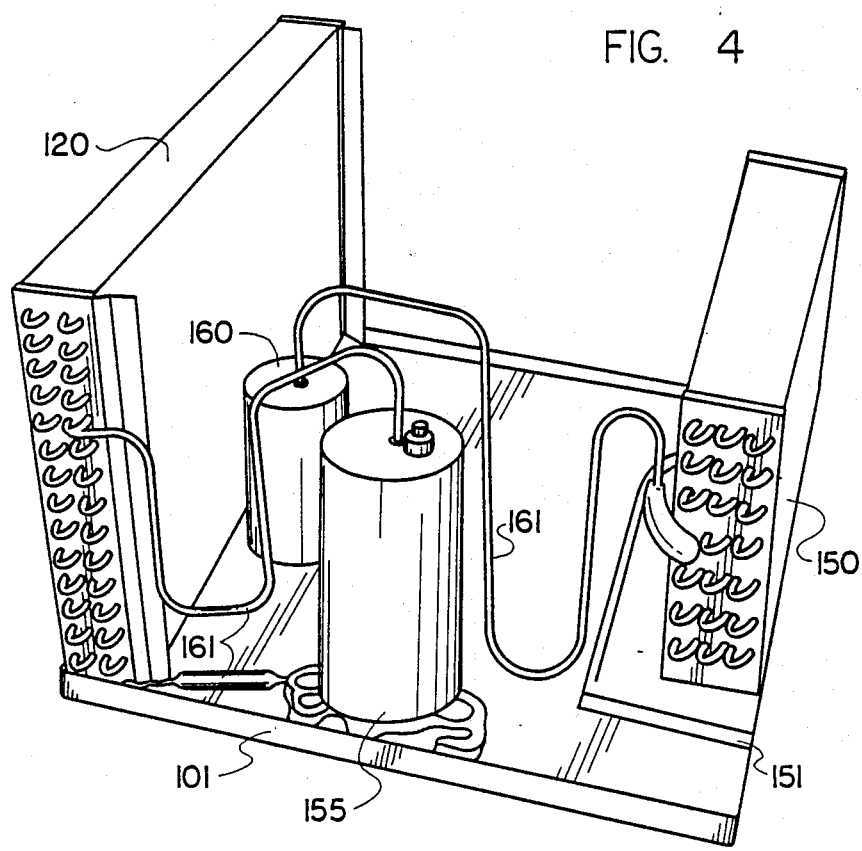
FIG. 4 is a perspective view of the refrigeration system module.

A completed refrigeration system module is illustrated in simplified form in FIG. 4, wherein the condensor 150 is illustrated as mounted vertically across the rear edge of the frame 105, and evaporator 120 is illustrated as mounted extending vertically at the front edge 115 of the base 102, a compressor 155 is mounted vertically on the base 101 centrally adjacent one side thereof, and a receiver 160 may be mounted generally between the compressor and the condensor. These elements are interconnected by tubing 161 in the conventional manner. All of the tubing is completely accessible for brazing, testing and repair without disassembly of the module. Thus, after the components have been mounted on the base 101, the tubing 161 can be connected between these units by brazing, or the like, from the side or above the module, the refrigeration system can be fully tested, and repairs can be made in the tubing and interconnections, if necessary, without disassembly of the module.

Figure 5:
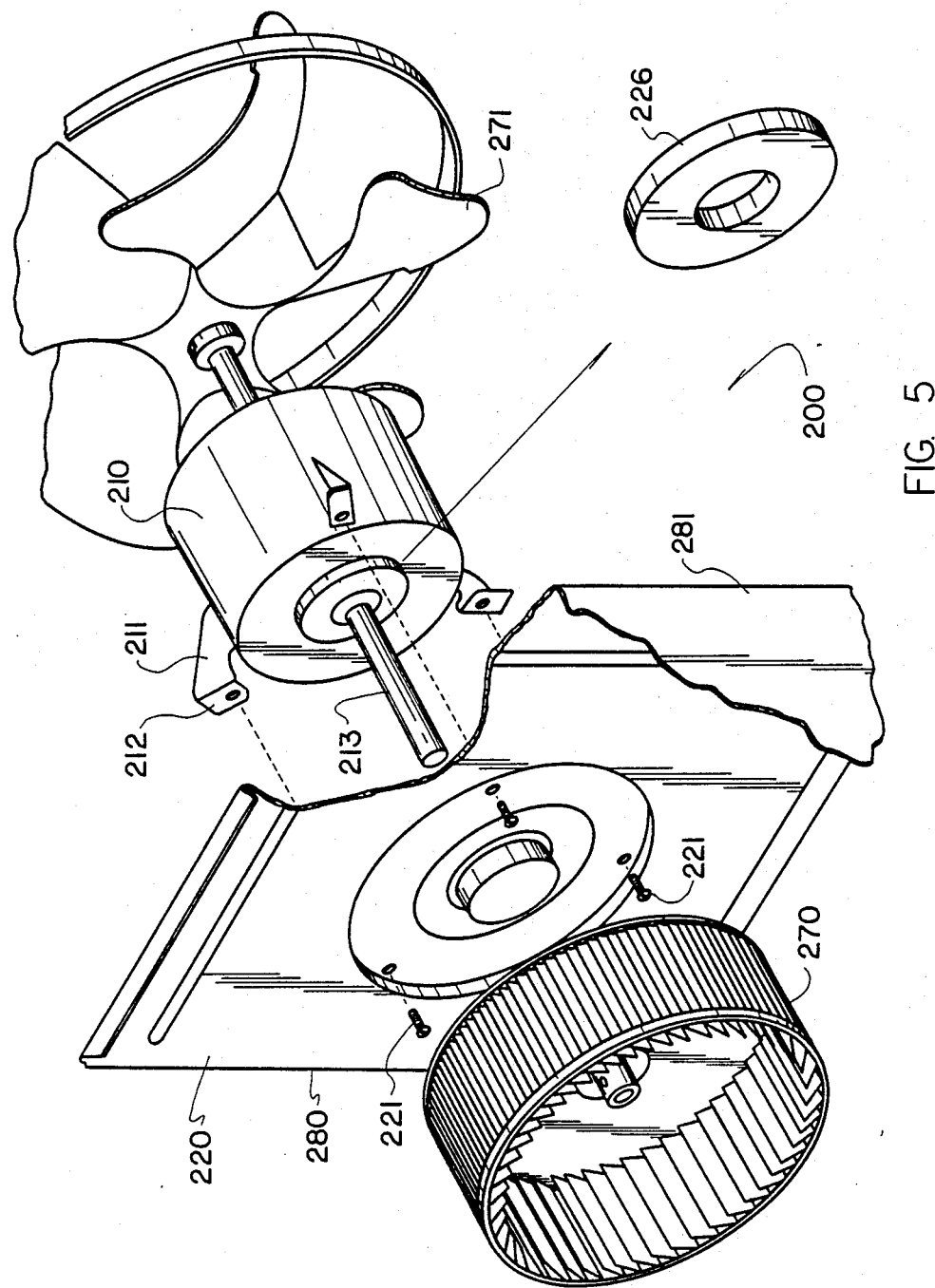
FIG. 5 is an exploded cut-away view of a portion of the air system module.

FIG. 5 illustrates generally the air system module 200. As illustrated, the blower motor 210 is provided with three legs 211 distributed about its periphery, and having mounting flanges 212 at the ends thereof. The legs 211 are preferably of spring steel and have their main portions extending in radial planes of the motor. The mounting flanges 212 extend in a plane perpendicular to the axis of the shaft 213, a short distance from the front of the motor.

Figure 6:
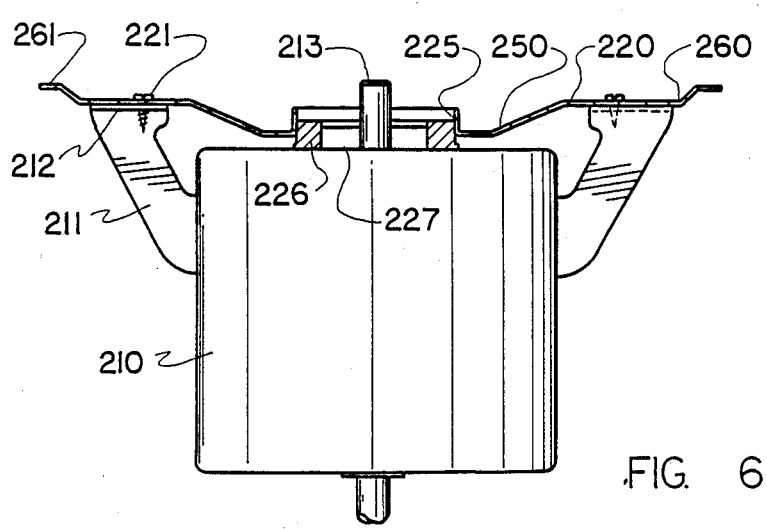
FIG. 6 is a simplified view illustrating the mounting of the motor of the air system module.

The motor 210 is mounted to the bulkhead portion 220, in a manner more clearly illustrated in FIG. 6, wherein it is seen that the flange portions 212 directly contact the bulkhead portion 220, and are held thereto by conventional fastening means such as the sheet metal screws 221, the axes of the sheet metal screws extending parallel to the shaft 213 for ease in assembly. The bulkhead portion 220 has a flanged hole 225 through which the shaft 213 extends, and an isolator ring 226 of a sound absorbent material, such as rubber, is held in the flanged hole 225 to extend to the adjacent axial end 227 of the motor. The isolator ring 226 may be affixed to the end bell of the motor 227, to assure that it remains in place, and it may be compressed fit in the hole 225.

The bulkhead portion 220 is provided with a first draw 250 between the portion to which the legs 211 are affixed, and the hole 225, the draw portion 250 being generally frusto concial to extend toward the motor adjacent the hole 225. In addition, the bulkhead portion 220 may be provided with a second draw 260, so that the portion thereof to which the legs 211 are affixed is parallel to and spaced from the main portion 261 of the bulkhead portion, toward the motor 210.

This mounting arrangement has been found to enable a reduction in noise in the operation of the air conditioner.

Thus, fan motors in room air conditioners are conventionally mounted to a sheet metal wall, or bulkhead, separating the evaporator section from the condensor section of the unit. When the motor is connected to the bulkhead in this manner, energy generated by the electrical design of the motor is easily transmitted to the sheet metal bulkhead, which can then act as a radiator of airborne sound and structure borne vibration. In a single phase induction motor, the problem frequency of the sound that is generated is twice the line frequency, or 120 Hertz. Energy at this frequency is radiated from the air conditioner, and is audible to people in the room in which the air conditioner is running as a low frequency hum.

Figure 7:
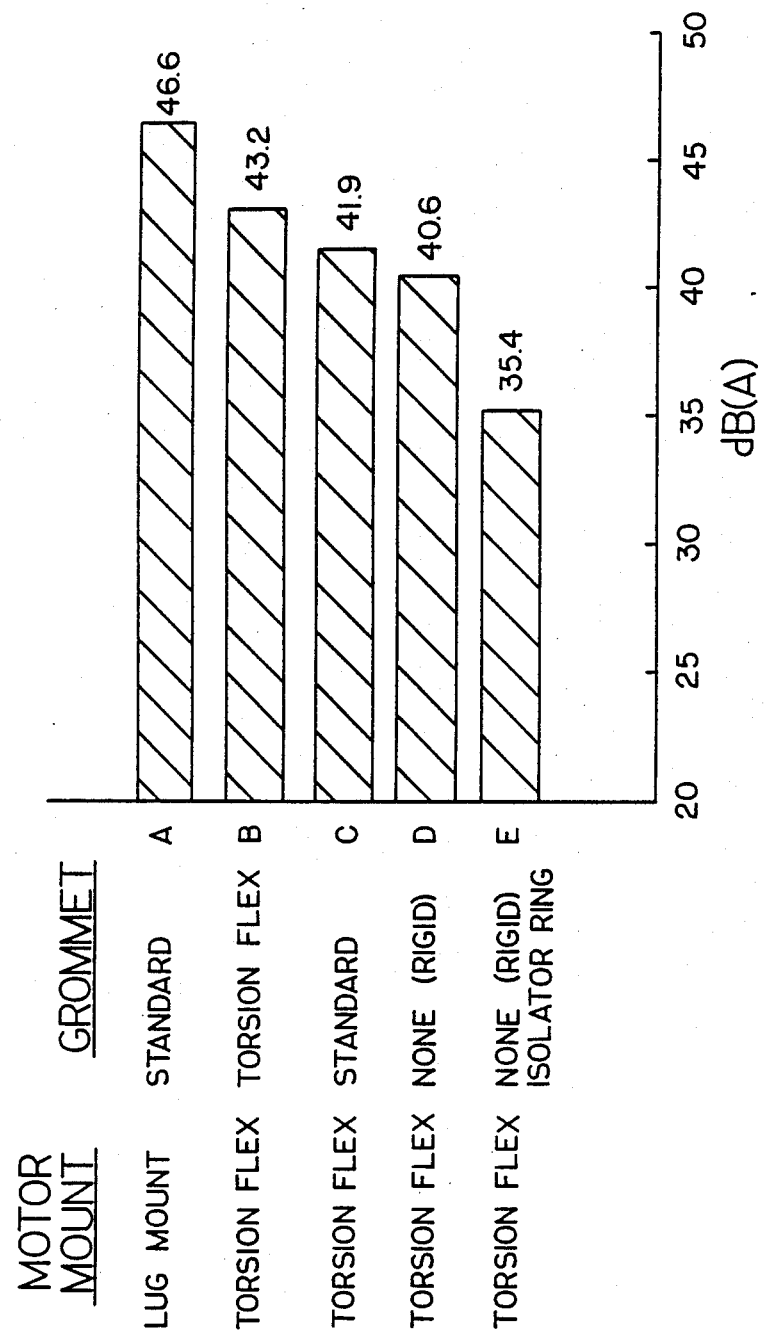
FIG. 7 is a table illustrating noise measurements on various motor mounting systems.

FIG. 7 illustrates the results of tests of various different motor mounts, in comparison with the mount of the present invention as discussed above, thus, line A of the graph illustrates the noise generated employing a mount wherein legs are affixed to the motor adjacent the end thereof, the legs being generally in planes tangential to the outside of the motor, and being held to the bulkhead by resilient grommets. Line B of FIG. 7 illustrates the noise generated when the legs extend from the motor in radial planes, and are held to the bulkhead by way of specially formed grommets. Line C of FIG. 7 illustrates the noise generated when legs of the same type are held to the bulkhead by another type of grommet, and line D illustrates the noise generated when legs of the same type, i.e. extending in radial planes, are rigidly affixed to the bulkhead. Line E of FIG. 7, illustrated the noise generated in the arrangement of the present invention wherein torsion legs are rigidly affixed to the bulkhead and an isolator ring is provided extending between the bulkhead and the motor, so as that a significant reduction in generation of noise has been achieved in accordance with the invention.

The first draw 260 acts as a stiffener, and provides a surface on which to mount the legs. Since the legs are made of spring steel, which is very forgiving, energy is dissapated before reaching the bulkhead. The second draw 250 acts as a cup in which the isolator ring is nested.

The noise tests of FIG. 7 are a measure of 120 Hertz noise, in a 27500 BTU air conditioner.

Figure 8:
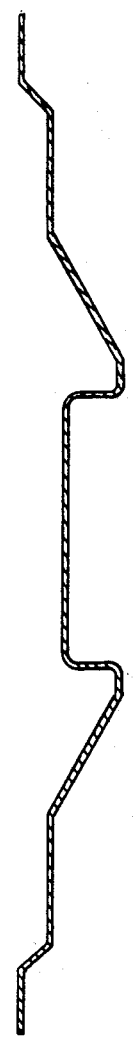
FIG. 8 is a line drawing illustrating a cross section of the bulkhead at the position at which the motor is mounted.

Details and dimensions of the shape of the bulkhead in a preferred embodiment of the invention are illustrated in FIG. 8.

Referring again to FIG. 5, a blower wheel 270 is affixed to the shaft 213 on the end thereof extending through the bulkhead portion 220, and fan blades 271 are affixed to the end of the shaft 213 extending from the other end of the motor, whereby the fan blades 271 will be positioned adjacent the condensor in the assembled unit.

As illustrated in FIG. 5, the bulkhead 220 has a main portion 280 adapted to extend vertically, transversely of the air conditioner, and a side portion 281 depending therefrom and adapted to extend along the side of the air conditioner. Each of these bulkhead portions have stiffening and mounting flanges at the tops and bottoms thereof. In addition, as illustrated in FIG. 1, a horizontal partition 285 is provided in the enclosed angle between the bulkhead portions 280 and 281, above the blower wheel 270, and a scroll 286 is provided surrounding the blower wheel 270, so that air can enter the center of the scroll 286 into the blower wheel, and exit through an aperture 287 in the horizontal partition 285 to be forced from the air conditioner, as cool air, above the evaporator.

While the blower wheel and fan blades are illustrated in FIG. 5 as being affixed to the motor shaft by hubs of conventional nature, it is preferable that the affixing of these air moving elements be made by conventional fastening means adapted to be tightened by tools extending in the direction of the shaft (e.g. by screws or bolts extending into the ends of the shaft), so that all operations of assembly of the air system module may be effected by tools having axes extending parallel to the axis of the shaft. This feature simplifies the assembly of the air system module.

Figure 9:
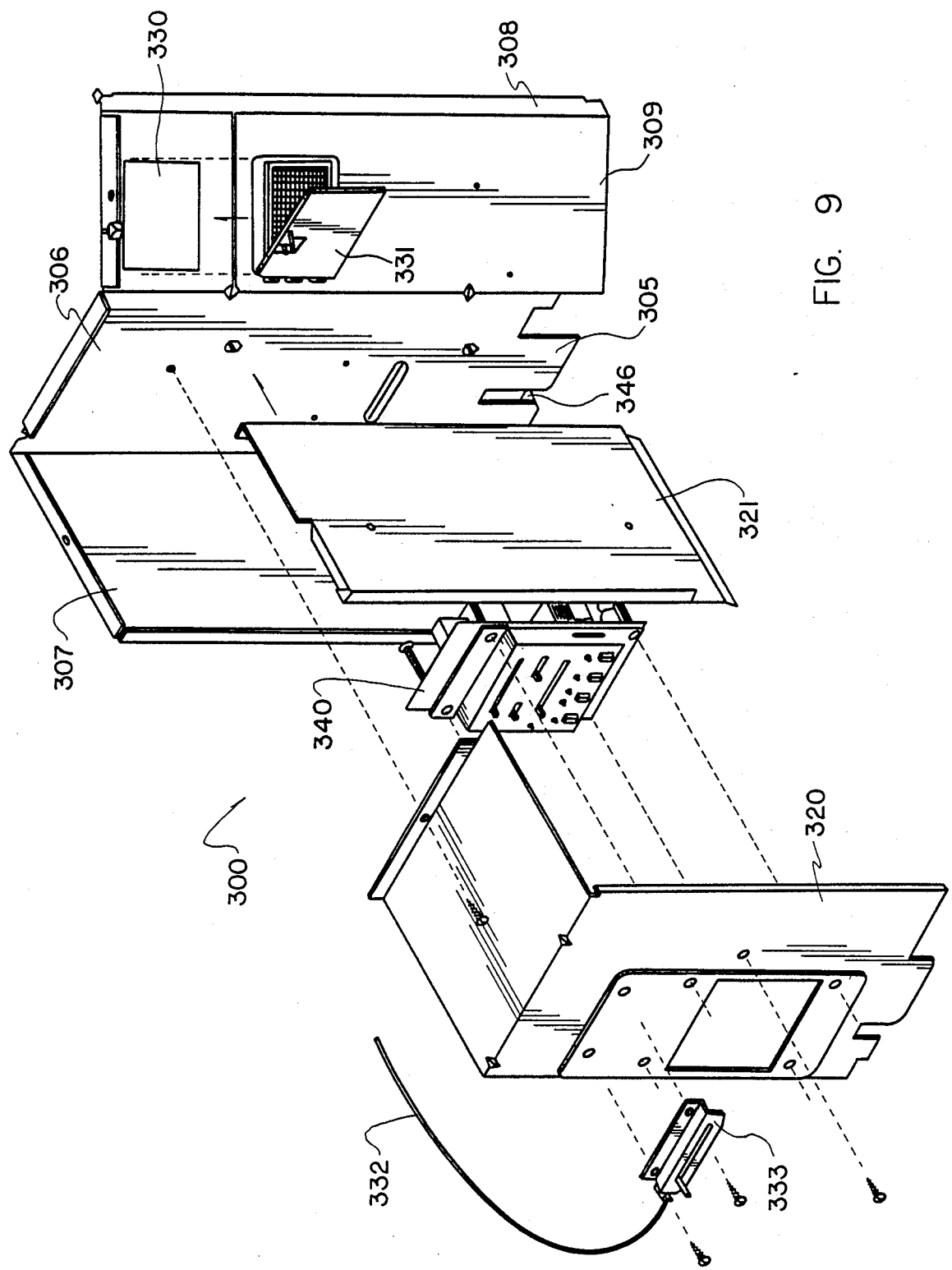
FIG. 9 is an exploded view of a portion of the control system module.

The control system module is illustrated in an exploded view of FIG. 9. This module includes a bulkhead portion 305 shaped, when combined with the bulkhead portion 220 of the air system module, to define a bulkhead extending completely across the air conditioner to separate the evaporator portion thereof from the condensor portion. The bulkhead portion 305 in this embodiment of the invention has a central portion 306 extending generally transversely of the air conditioner, a side portion 307 adapted to extend along the side of the air conditioner, and an inclined wall portion 309 extending rearwardly from the portion 306 and having a flanged edge 308, to be described, adapted to be joined to the bulkhead portion of the air system module. The bulkhead portion 305 has flanges at its top and bottom edges, as well as along the front of the portion 307, for mounting and strength, in accordance with conventional practice.

Figure 10:
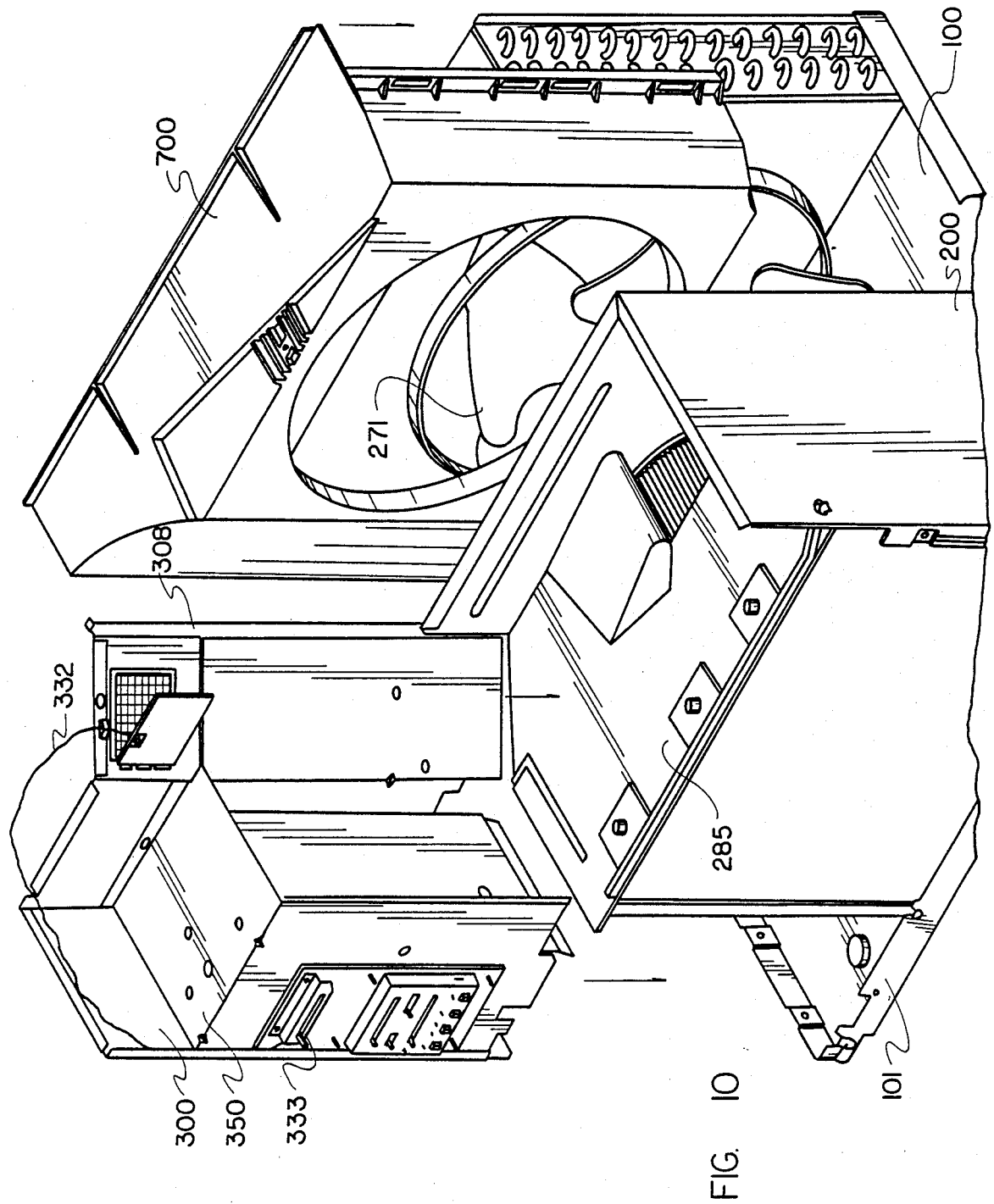
FIG. 10 is a further exploded view illustrating assembly of the air conditioner.
Figure 11:
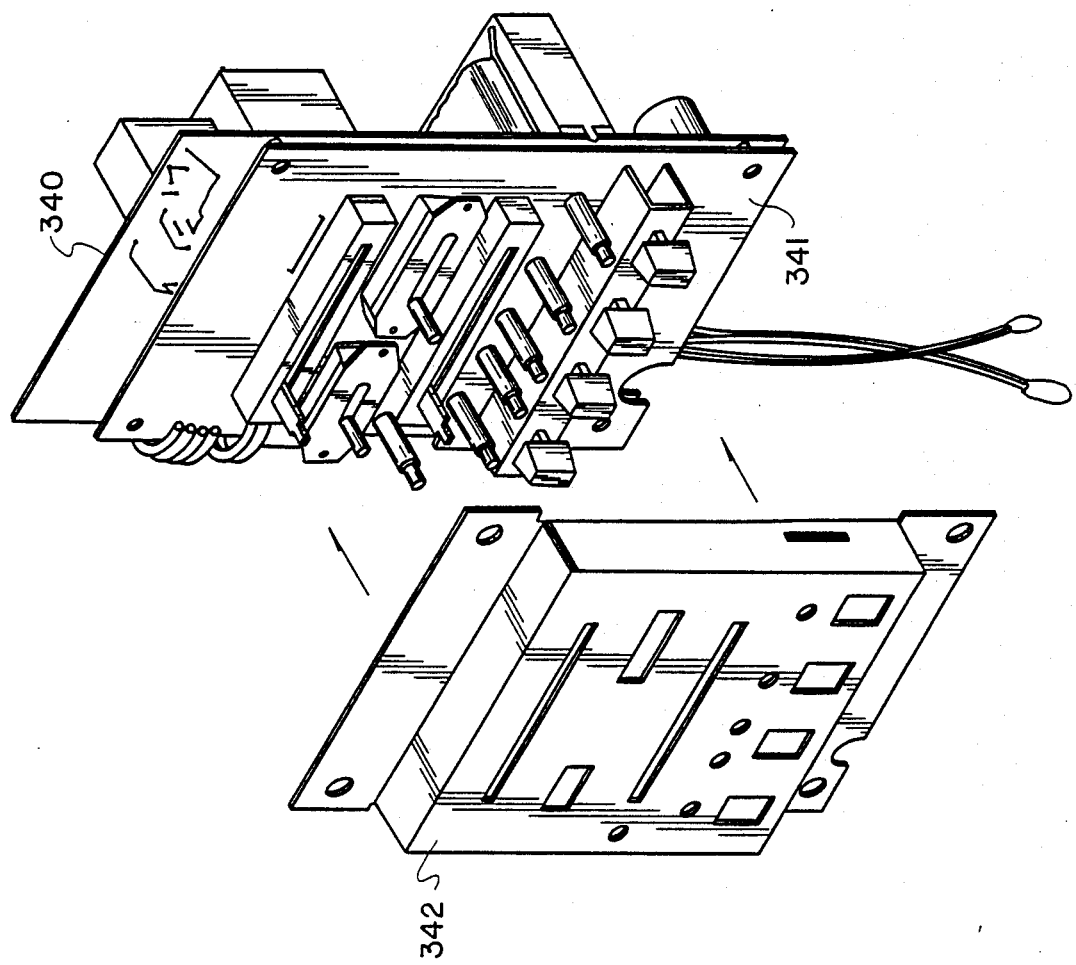
FIG. 11 is an exploded perspective view of a portion of the control system module.

The control module further includes partitions 320, 321 adapted to be affixed to the bulkhead portion 305 to define a housing, illustrated generally by reference numeral 350 in FIG. 10, for housing controls and electrical components, for example, as illustrated in FIG. 11. As illustrated, an aperture 330 is provided in the bulkhead portion 307, for receiving a ventilation damper 331, controlled by cable 332 from the front panel control 333, for controlling the addition of fresh air to the circulation system. The electric circuitry is mounted on a circuit board 340, as illustrated in FIGS. 9 and 11, with a control panel 341 affixed thereto and carrying the electrical control devices for the air conditioner, such as, for example, on and off controls, speed controls, etc. A decorative plate 342 is fitted to the front of the panel 341, so that all of the electrical controls of the air conditioner may be fitted, as a unit, in a front aperture in the housing wall 320. The circuit board 340 is connected to the air system module and the refrigeration system module by cable harnesses (not shown), adapted to pass through apertures 346 in the bulkhead wall 306, for the compressor and fan motor. The cable may have pushon terminal ends so that, once the unit has been assembled, the electrical connections may merely be pushed onto the corresponding terminals of the fan motor and compressor. It is further advantageous that the capacitor for the compressor and/or fan motor be mounted on the bulkhead 306 for connection by the corresponding cable.

Figure 13:
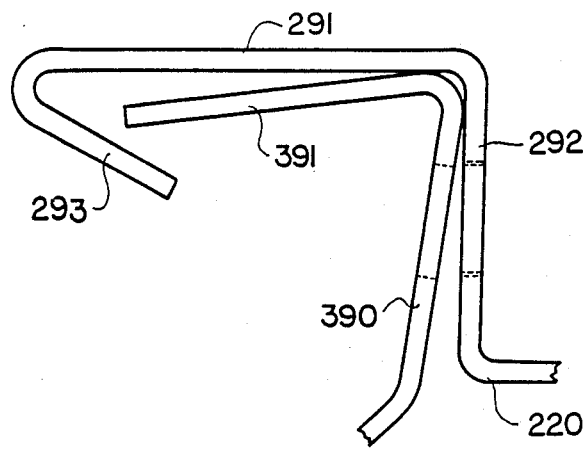
FIGS. 12-14 illustrate the various steps in interlocking the bulkhead portions of the air system module and control system module.
Figure 14:
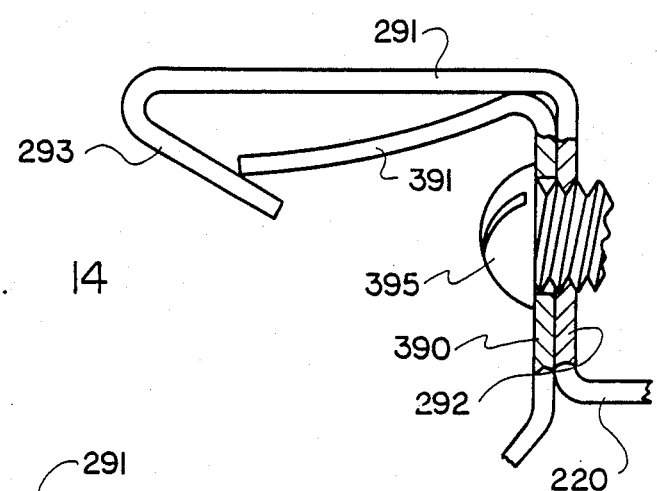
Figure 12:
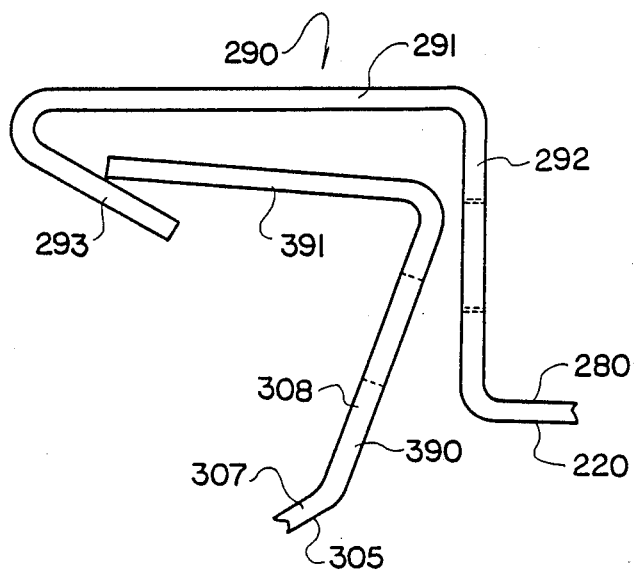

Referring now to FIG. 10, wherein the air system module 200 is shown assembled to the base 101, it is apparent that this portion of the assembly may be effected merely by inserting the air system module 200 vertically onto the base. The control system module 300 may then be lowered vertically onto the base, as illustrated by the arrows in FIG. 10, with the flanged edge 308 of the control system module slidingly engaging a corresponding flange arrangement of the air system module. It is necessary for this joint to be air tight, and for this purpose a novel interconnection of the bulkhead portions 220 and 305 has been provided, as illustrated in FIGS. 12, 13 and 14. As illustrated, the bulkhead portion 220 has a rearwardly extending guide 290 having a central vertical portion 291 parallel to the bulkhead portion 220 and spaced rearwardly therefrom, a portion 292 extending from the central portion 291 forwardly to the bulkhead wall portion 280 in a generally front to back direction, and an inclined edge portion 293 extending forwardly and inclined generally towards a wall portion 280. These wall portions 291-293 extend substantially throughout the vertical height of the wall portion 280. In addition, the flange portion 308 includes a rearwardly angled portion 390 adapted in assembly to extend in the front to back direction, and an inclined end portion 391 extending rearwardly from the portion 390 at a small angle. The wall portion 390 is of approximately the same length as the wall portion 292, and the wall portion 391 is of lesser length than the wall portion 290, but yet sufficiently long that it cannot be withdrawn forwardly from the guide 290 due to interference with the inclined wall portion 293.

In assembly, the air system module is first assembled to the base 101. Then, the control system module is held with the wall portion 390 at a slight angle to the wall portion 292, as illustrated in FIG. 12, so that the wall portion 391 becomes captured in the guide defined by the wall portions 291-293. This may be effected by rotation of the control system module in the direction of the arrow, as illustrated in FIG. 12, with the control system module almost at its lowermost position, or the control system module may be lowered with this cooperating relationship of the guide members as illustrated in FIG. 13. After the control system module is lowered almost to its final position, it is rotated as illustrated in FIG. 14, with the wall 390 abutting the wall 292, and the end of the inclined wall 391 abutting the inside edge of the wall portion 293, thereby to define a tight seal between these members. As illustrated in FIG. 14, this may result in slight bending of the wall portion 391 due to its interference with the wall portion 293, to improve the mechanical seal between these members. The bulkhead portion 305 may now be lowered, perhaps with some force, to its final position, and affixed to the base 101. The bulkhead portions may be held together with a minimum number of screws 395, such as sheet metal screws, holding the wall portions 390 and 292 together.

The arrangement as illustrated in FIGS. 12-14 permits the simple assembly of the bulkhead portions together, with a tight fit between the elements only being effected when the bulkhead portions are almost at their final positions. The interconnection further enables holding of the bulkhead portions together by simple fastener, such as screws or the like. The assembly may be thus initially made with the control system module rotated approximately 5 degrees at the pivot point from its final lock parallel position, so that rotation to the parallel position enables the locking of the flanges with a single screw fastener at the top, with a torsional wedge effect securely locking the two partition portions together. The fastening arrangement further enables the assembly of the modules together by generally vertical insertion of the control system module to the other two modules.

Figure 15:
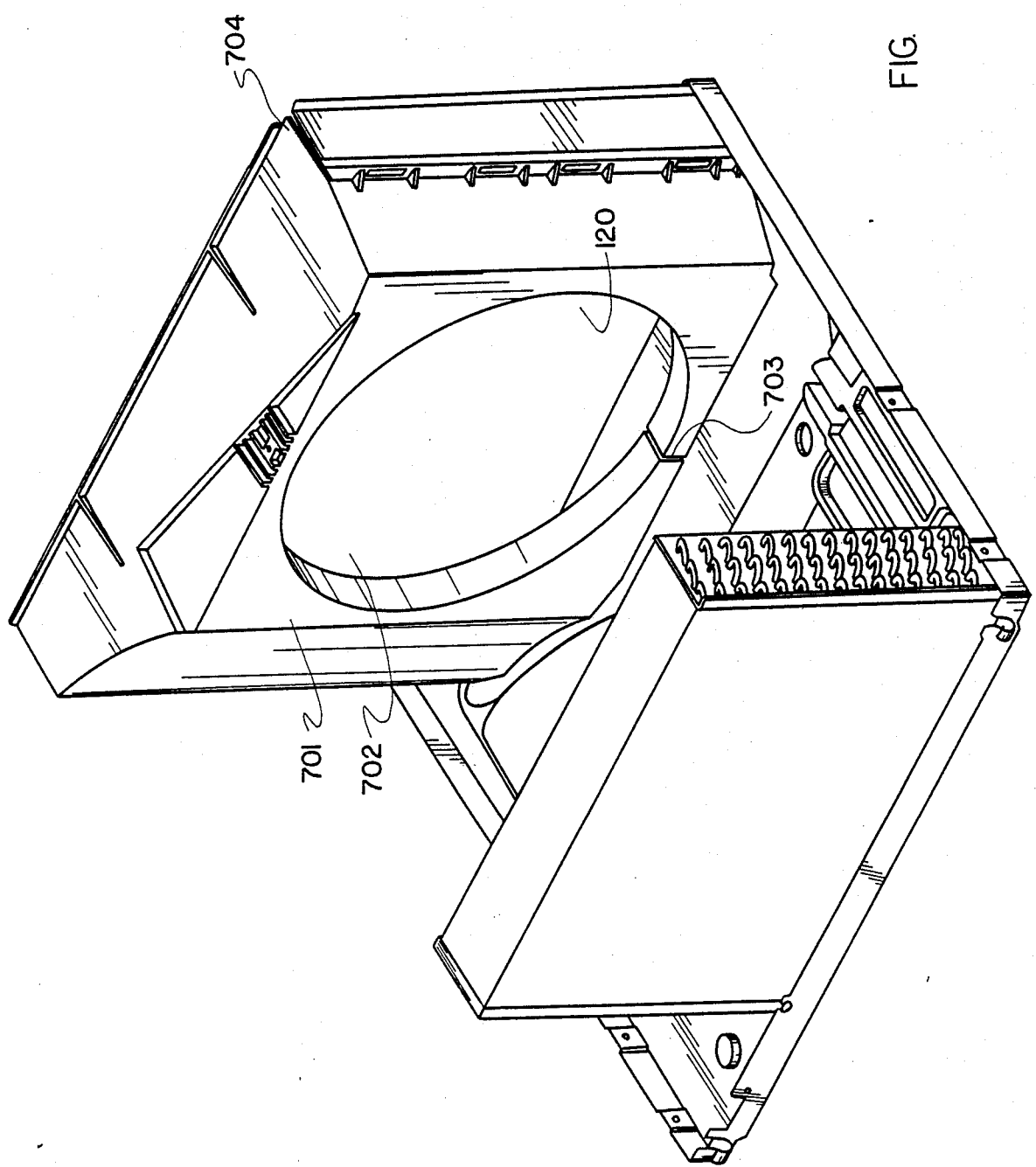

As further illustrated in FIG. 10, a shroud 700, for example of molded plastic, may also be assembled vertically over the fan blades 271. As illustrated in FIG. 15, wherein the air system module and control system module have been omitted for the sake of clarity, the shroud 700 has a front wall 701 with a central round aperture 702 to define the path of air from the fan blades. The wall 701 has a split 703 at its lower edge, to permit it to be fit over the shaft of the motor. The shroud further has rearwardly extending walls 704 to surround the condensor flange 121. As an alternative to the arrangement of FIG. 15, the shroud may be formed in two pieces, i.e. an upper piece and a lower piece, with the lower piece being fitted to the base before assembly of the air system module thereto, and the upper portion fit onto the lower portion after assembly of the air system module.

The upper portion of the shroud may be held in position with respect to the air system module by a simple flat bracket 710, as illustrated in FIG. 1, screwed by vertically extending screws 711, 712, to the shroud and the bulkhead portion 220.

The air conditioner arrangement of the present invention reduces manufacturing costs by providing a design which can be assembled in distinct separate modules, and wherein each module can be efficiently assembled by specialized automatic equipment. The modules may be brought together in the final assembly, with a minimum number of fasteners.

While the invention has been disclosed and described with reference to a minimum number of embodiments, it is apparent that variations and modifications may be made therein. For example, the shroud 700 may be molded in one piece with protrusions 705 extending to the bulkhead and attached to such by screws. This then forms part of the air system module and when assembled to the refrigeration module makes a sliding fit with end bracket 121. It is therefore intended in the following claims to cover each such variation and modification as follows within the true spirit and scope of the invention.

I claim:

1. An air conditioner unit comprising a refrigeration system module, an air system module and a control system module,
   said refrigeration system module comprising a refrigeration system comprising all refrigerant path components of said air conditioner unit including an interconnected compressor, an evaporator and a condensor each separately mounted on a base at the bottom of the module,
   said air system module being mountable in a vertical direction to said refrigeration system module as a unit and including a first bulkhead portion fit between said evaporator and condensor, a motor arrangement mounted to said first bulkhead portion, a fan driven by said motor arrangement on the side of said first bulkhead portion toward said condensor, and a blower driven by said motor arrangement on the side of said first bulkhead portion toward said evaporator,
   said air system module further comprising a horizontal bulkhead extending forwardly from said first bulkhead portion over said evaporator, and including a port extending through said horizontal bulkhead to direct air driven by said blower to flow into said evaporator unit below said horizontal bulkhead, then upwardly through said port and outwardly through said air conditioner,
   said control system module being mountable in a vertical direction to said refrigeration system module as a unit and including a second bulkhead portion separable from said first bulkhead portion and positioned to adjoin said first bulkhead portion, a control panel, and control means for controlling said motor arrangement, whereby said air system module and control system module are separately mountable on said refrigeration system module,
   said base of said refrigeration system module having first and second opposite edges, said evaporator being mounted adjacent said first edge and said condensor being mounted adjacent said second edge, said first and second bulkhead portions extending across said base intermediate said first and second edges, with said control panel adjacent said second edge thereof,
   said control system module further comprising at least one partition, said second bulkhead portion, control panel and partition defining a housing for said control means.

2. The air conditioner unit of claim 1 further comprising a housing surrounding said refrigeration, air and control system modules, said first and second bulkhead portions and said housing substantially fully separating flow of air between said evaporator and condensor.

3. The air conditioner unit of claim 1 wherein said first bulkhead portion has an edge with a first flange depending at a given first angle therefrom to define a first junction, said second bulkhead portion has an edge with a second flange depending therefrom at a given second angle less than said first angle to define a second junction, said second junction being nested within said first junction, whereby said first junction forms a pivot for said second junction, means holding said second bulkhead portion against said first bulkhead portion adjacent said flanges thereof, whereby said first and second flanges are angularly spaced apart, and a third flange depending from said second flange at the edge thereof away from said first junction, said third flange extending at an angle whereby the free edge of said second flange abuts the side of the third flange in the interior angle defined by said first and third flanges.

4. The air conditioner unit of claim 3 wherein said holding means comprises a screw.

5. The air conditioner unit of claim 1 wherein said base of said refrigeration system module has first and second opposite edges, said evaporator being mounted adjacent said first edge and said condensor being mounted adjacent said second edge, said first and second bulkhead portions extending across said base intermediate said first and second edges, with said control panel adjacent said second edge thereof,
   said second bulkhead portion having a ventilation damper therein, and a control for said ventilation damper is mounted on said control panel.

6. An air conditioner unit comprising a refrigeration system module, an air system module and a control system module,
   said refrigeration system module comprising a refrigeration system comprising all refrigerant path components of said air conditioner unit including an interconnected compressor, an evaporator and a condensor each separately mounted on a base at the bottom of the module,
   said air system module being mountable in a vertical direction to said refrigeration system module as a unit and including a first bulkhead portion fit between said evaporator and condensor, a motor arrangement mounted to said first bulkhead portion, a fan driven by said motor arrangement on the side of said first bulkhead portion toward said condensor, and a blower driven by said motor arrangement on the side of said first bulkhead portion toward said evaporator,
   said air system module further comprising a horizontal bulkhead extending forwardly from said first bulkhead portion over said evaporator, and including a port extending through said horizontal bulkhead to direct air driven by said blower to flow into said evaporator unit below said horizontal bulkhead, then upwardly through said port and outwardly through said air conditioner,
   said control system module further comprising at least one partition, said second bulkhead portion, control panel and partition defining a housing for said control means.

7. A method for producing an air conditioner, comprising assembling a refrigeration system module of all refrigerant passing components of the air conditioner including a compressor, an evaporator, and a condensor, on a base at the bottom of the refrigeration system module, assembling an air system module including a first bulkhead, a motor mounted to said first bulkhead, a fan driven by said motor on one side of said first bulkhead, and a blower driven by the motor on the other side of said first bulkhead.

said first bulkhead having an edge with a first flange depending at a given first angle therefrom to define a first junction, assembling a control system module including a second bulkhead, a control panel mounted to said second bulkhead, and a control arrangement for said motor, said second bulkhead having an edge with a second flange depending therefrom at a given second angle less than said first angle to define a second junction, said second junction constructed to fit within said first junction on said first bulkhead, whereby said first junction forms a pivot for said second junction and a third flange depending from said second flange at the edge thereof away from said first junction, and separately mounting said air system module and said control system module downwardly onto said refrigeration system module, with said first bulkhead between said evaporator and condensor and said second bulkhead adjoining said first bulkhead by lowering said control system module to engage said base while holding the free edge of said second flange away from said third flange, then rotating said control system module until said free edge of said second flange abuts the side of said third flange in the interior angle defined by said first and third flanges, and then affixing said second bulkhead against said first bulkhead adjacent said flanges thereof.

* * * * *